Jan. 17, 1928.
J. D. MERRIFIELD
1,656,594
METHOD OF FORMING TAPERED THREADS
Filed Feb. 19, 1923
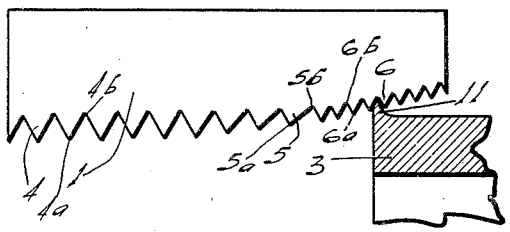
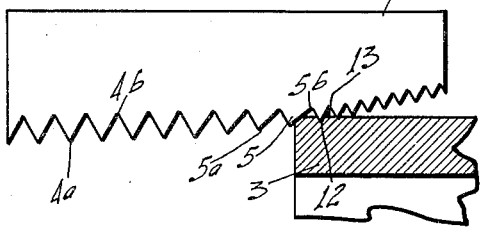
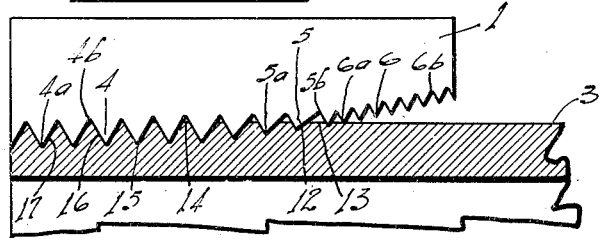
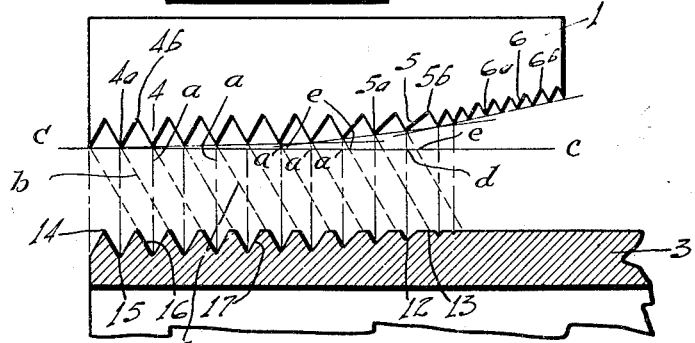
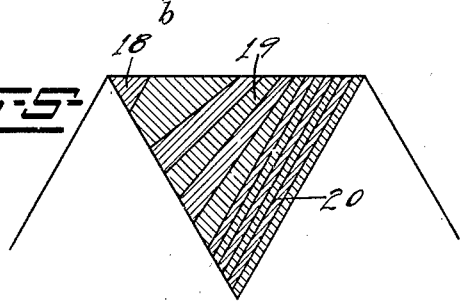
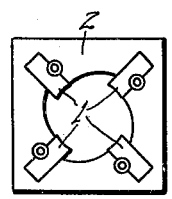
Inventor
John D. Merrifield
Attorney Patented Jan. 17, 1928.

1,656,594

UNITED STATES PATENT OFFICE.

JOHN D. MERRIFIELD, OF ERIE, PENNSYLVANIA, ASSIGNOR TO REED MANUFACTURING COMPANY, OF ERIE, PENNSYLVANIA, A CORPORATION OF PENNSYLVANIA.

METHOD OF FORMING TAPERED THREADS.

Application filed February 19, 1923. Serial No. 619,880.

In cutting tapered teeth, such as pipe threads, the common method has been to cut a V-shaped thread, taking a cut off of both slopes as the cutting tool is advanced. I have devised a method whereby these threads may be cut simultaneously as with a die, or cutting tool, and from one slope thus reducing the effort necessary to cut the thread and making a very much more desirable chip. In cutting such a thread it is necessary to have the finished thread largely under, or along the tool cutting the thread and inasmuch as the cutting is done entirely on one of the slopes, preferably the rear slope of the thread as it is cut, it is necessary to vary the lead of the tool cutting the thread so as to compensate for the shift in the trough of the thread formed with each succeeding cut, in other words, the lead should increase at least equal to the thickness of the cut. In carrying out my method also I prefer to cut the initial threads with one wall at a slightly different angle than the other walls in order that the thread may be more readily started so that with this method it is feasible to start the die, or cutting tool, without the use of the ordinary lead screw.

In the accompanying drawings I have exemplified my invention as being applied to the cutting of an external thread but it will be understood that I do not wish to be so limited. The die by which the method may be practiced is illustrated in the accompanying drawings as follows:—

Fig. 1 shows a side elevation of a chaser starting on a cut on the pipe.

Fig. 2 a similar view with the chaser progressed slightly farther.

Fig. 3 a similar view with the cut of the thread completed.

Fig. 4 a diagrammatical view showing the relation of teeth of the cutting chaser and the threads cut.

Fig. 5 an enlarged view showing the succeeding cuts made as they are made.

Fig. 6 an elevation of a die in which the chasers may be mounted.

1 marks the chaser, 2 the body of the die, and 3 a bar, or pipe cut. The chasers of the die have the finishing teeth 4 with the crests $4^a$ and troughs $4^b$, the starting teeth 5 with the crests $5^a$ and the troughs $5^b$, and the fine entering teeth 6 having the crests $6^a$ and troughs $6^b$. As shown in Fig. 4 dash lines $a$ indicate the relation of the crests of the teeth with the troughs of the teeth being cut, lines $b$ each extended from the tooth of the finished cut to the tooth forming the cut, a line $c$—$c$ parallel to the axis and radially positioned along the crest of the tooth of smallest diameter of the chaser, $d$ points of intersection between the lines $a$ and $c$ and $e$ points of intersection between the lines $b$ and $c$. The distance between the points $e$ and $d$ is slightly less than the distance between the crests $4^a$. This variation indicates the difference between the lead of the teeth of the die and the spiral of the thread cut, the distance between the points $e$ indicating the pitch of the thread of the tool and the distance between the points $d$ indicating the pitch of the thread as actually cut.

The pipe ordinarily as cut off has a burr 11 and the entering teeth 6 are particularly designed to engage and pass this obstruction. The starting teeth form a small spiral groove 12 in the bar, leaving a flat crest 13. This is the reverse of the ordinary manner of cutting threads with dies in that ordinarily the entering or starting teeth cut a flat trough and leave hair-like threads on the bar. The difficulty with this method is that these threads have not sufficient substance to sustain the thrust of leading on the die and consequently are stripped. With the present structure with the broad metal between the starting grooves there is sufficient metal to prevent stripping and it is consequently possible to start the die without the ordinary lead screw.

The threads cut on the pipe have the crests 14, troughs 15, the forward slope 16 and rearward slope 17. It will be noted that as the threads and the initial work are started the crests 14 are flat and as the die progresses the cut is taken from the front slope of the thread entirely but with each passage of the die until the slopes meet in a point at the final crests these threads with the flat crest are the final threads and as noted correspond with the trough of the die. The spiral of these finished threads, however, are not the same as the spiral of the die, the spiral die varying from the spiral of the finished thread in accordance with the thickness of the shaving removed where it is on the front slope. As preferred and shown the lead of the die is as much greater as the finished thread as the thickness of the shaving.

The successive cuts are shown in Fig. 5, the entering teeth making a cut of material indicated at 18, the starting teeth making cuts indicated at 19 and the teeth 4 a series of ribbon-like cuts as indicated at 20.

It will be observed that the peaks of the teeth in the die correspond with the troughs of the finished thread and inasmuch as the cutting is done entirely along the front slope of the thread the lead of the teeth in the cutter is as much greater than the lead of the threads being cut as the thickness of the cut in one rotation so that the troughs of the thread cut are properly spaced under the die. Thus the variation in pitch which the cutting from one slope alone would bring about is rectified so that the troughs of all the finished threads are properly spaced from the deepest cut to the most shallow cut. I prefer to make the entering threads finer but of the same lead as the other threads. Ordinarily there are two threads in the same space as occupied by one thread of the ordinary cutting thread and I prefer to make the starting threads with the cutting face inclined to the finished thread so that it will more readily wedge on to the pipe and thus facilitate the starting of the die on the pipe. This is done while still maintaining the troughs between the threads in proper relation.

What I claim as new is:—

1. The method of forming tapered threads which consists in cutting a spiral groove by cuts simultaneously made at a plurality of points at intervals about the axis and of a lead differing from the finished thread and cutting one slope of the groove to finish the thread.

2. The method of forming tapered threads which consists in cutting a spiral groove by cuts simultaneously made at a plurality of points at intervals about the axis and of a lead differing from the finished thread and cutting one slope of the groove to finish the thread and rectifying the pitch with the cut.

3. The method of forming external tapered threads which consists in cutting a spiral groove by cuts simultaneously made at a plurality of points at intervals about the axis and of a lead differing from the finished thread and cutting one slope of the groove to finish the thread.

4. The method of forming external tapered threads which consists in cutting a spiral groove by cuts simultaneously made at a plurality of points at intervals about the axis and of a lead differing from the finished thread and cutting one slope of the groove to finish the thread and rectifying the pitch with the cut.

5. The method of forming tapered threads which consists in making a plurality of cuts in tapered relation from one slope of the thread and completing the threads simultaneously and rectifying the pitch of the finished thread by varying the spiral of the cut.

6. The method of forming external tapered threads which consists in making a plurality of cuts in tapered relation from one slope of the thread and completing the threads simultaneously and rectifying the pitch of the finished thread by varying the spiral of the cut.

7. The method of cutting tapered threads which consists in making a plurality of cuts at intervals about the axis and along the axis upon one slope of the threads and completing the threads simultaneously and rectifying the pitch of the finished thread by varying the spiral of the cut.

8. The method of forming tapered threads which consists in cutting a spiral groove of a lead differing from the finished thread, cutting one slope of the groove to finish the thread and completing the threads simultaneously, the starting cut on the slope being at an inclination differing from the succeeding cuts.

9. The method of forming tapered threads which consists in cutting a spiral groove of a lead differing from the finished thread, cutting one slope of the groove to finish the thread and completing the threads simultaneously, the starting cut on the slope being at an inclination less abrupt than the succeeding cuts.

10. The method of forming external tapered threads which consist in cutting a spiral groove of a lead differing from the finished thread, cutting one slope of the groove to finish the thread and completing the threads simultaneously, the starting cut on the slope being at an inclination differing from the succeeding cuts.

11. The method of forming external tapered threads which consists in cutting a spiral groove of a lead differing from the finished thread, cutting one slope of the groove to finish the thread and completing the threads simultaneously, the starting cut on the slope being at an inclination less abrupt than the succeeding cuts.

In testimony whereof I have hereunto set my hand.

JOHN D. MERRIFIELD.